US008489828B2

(12) United States Patent
Tsuchiya et al.

(10) Patent No.: US 8,489,828 B2
(45) Date of Patent: Jul. 16, 2013

(54) CONTROL APPARATUS HAVING NON-VOLATILE RAM, PROTECTION APPARATUS AND METHOD APPLIED THERETO

(75) Inventors: Naoya Tsuchiya, Kariya (JP); Kenji Mochizuki, Aichi-ken (JP)

(73) Assignee: Denso Corporation, Kariya (JP)

( * ) Notice: Subject to any disclaimer, the term of this patent is extended or adjusted under 35 U.S.C. 154(b) by 158 days.

(21) Appl. No.: 13/113,302

(22) Filed: May 23, 2011

(65) Prior Publication Data

US 2011/0289285 A1 Nov. 24, 2011

(30) Foreign Application Priority Data

May 21, 2010 (JP) ................................. 2010-117318

(51) Int. Cl.
*G06F 12/00* (2006.01)
(52) U.S. Cl.
USPC .......................................... 711/154; 711/103
(58) Field of Classification Search
None
See application file for complete search history.

(56) References Cited

U.S. PATENT DOCUMENTS

| 5,818,771 | A | * | 10/1998 | Yasu et al. ..................... 365/195 |
| 5,900,008 | A | | 5/1999 | Akao et al. |
| 6,032,237 | A | * | 2/2000 | Inoue et al. .................... 711/163 |
| 6,282,045 | B1 | * | 8/2001 | Glover ......................... 360/73.03 |
| 6,367,050 | B1 | * | 4/2002 | Akao et al. ..................... 716/139 |
| 6,809,989 | B2 | * | 10/2004 | Takahashi et al. ........ 365/230.08 |
| 6,836,877 | B1 | * | 12/2004 | Dupenloup .................... 716/103 |

FOREIGN PATENT DOCUMENTS

| JP | H07-114497 | 5/1995 |
| JP | 2003-104137 | 4/2003 |

* cited by examiner

*Primary Examiner* — Reginald Bragdon
*Assistant Examiner* — Hannah A Faye-Joyner
(74) *Attorney, Agent, or Firm* — Nixon & Vanderhye PC

(57) ABSTRACT

A control apparatus including a non-volatile RAM divided into a plurality of memory regions including ROM region and RAM region, CPU capable of executing a plurality of types of access to the non-volatile RAM and a protecting portion intervening between the CPU and the non-volatile RAM. The protecting portion includes a register for storing address information capable of specifying address ranges corresponding to the ROM region and RAM region among the memory regions of the non-volatile RAM, access enabling module for enabling the CPU to write data to the ROM region while an enable signal inputted to the protecting portion externally is active, when the CPU performs a write-access to the ROM region, and initializing module for initializing the address information stored in the register to be predetermined address information as an initial value when the enable signal is deactivated after activating the enable signal.

15 Claims, 4 Drawing Sheets

CONTROL APPARATUS HAVING NON-VOLATILE RAM, PROTECTION APPARATUS AND METHOD APPLIED THERETO

CROSS REFERENCE TO RELATED APPLICATION

This application is based on and claims the benefit of priority from earlier Japanese Patent Application No. 2010-117318 filed on May 21, 2010, the description of which is incorporated herein by reference.

TECHNICAL BACKGROUND

1. Field of the Invention

The present invention relates to a control apparatus having a non-volatile random access memory (RAM), central processing unit (CPU) and protecting portion intervening between RAM and CPU.

2. Description of the Related Art

Recently, in a system having non-volatile RAM (Random Access Memory), the non-volatile RAM is sometimes required to be divided into ROM (Read Only Memory) regions and RAM regions. For example, Japanese Patent Laid-Open Publication No, 1995-114497 discloses a system having the non-volatile RAM, CPU and a protecting portion. The protecting portion (i.e., bus control circuit) intervenes between the RAM and CPU so as to prohibit writing to a region defined as the ROM.

In this configuration, a register arranged in the protecting portion includes address information which specifies the ROM region and an access mode, i.e., writing data to the ROM region is detected based on the address information to prohibit write access to the ROM region.

In the above-described configuration, data such as program data to be used in the CPU are stored in the ROM region. This type of data is preferably renewed when it is necessary. To renew the data, for instance, it is considered that writing data to the ROM region is allowed only when an external signal is inputted.

However, when such an external signal is being allowed to enter the system, unintended signals such as noise may enters as well. In this regard, depending on the signal, the address information could possibly be changed. If the address information is changed, e.g. a part of the ROM region is recognized erroneously as a RAM region, unintended access, i.e., writing data to the ROM region may occur.

In the above-described configuration, it is convenient that the data stored in the ROM region is renewed. However, the above-described problem is likely to happen.

SUMMARY

An embodiment provides an apparatus and a method in which the data stored in ROM region is renewed as needed and unintended data writing to the ROM region in the non-volatile RAM can be prevented.

As a first aspect of the configuration, there is provided a control apparatus, e.g. microprocessor including a non-volatile RAM divided into a plurality of memory regions including a ROM region from which data is read and a RAM region where data is read and written, a CPU capable of executing a plurality of types of access to the non-volatile RAM, the plurality of access types including writing data to the ROM region; and a protecting portion intervening between the CPU and the non-volatile RAM.

The protecting portion includes a register for storing address information capable of specifying address ranges corresponding to the ROM region and the RAM region among the memory regions of the non-volatile RAM, access enabling means for enabling the CPU to write data to the ROM region while an enable signal inputted to the protecting portion externally is active when the CPU performs a write-access to the ROM region, and initializing means for initializing the address information stored in the register to predetermined address information as an initial value when the enable signal is deactivated after activating the enable signal. Further, the protecting portion may be configured to include a means for arbitrating the data bus and the instruction bus.

Thus, the control apparatus is configured to enable writing data into the ROM region while the enable signal is active. Therefore, programs to be used by the CPU processing or the like can be renewed as needed.

Here, it is considered that when the enable signal is used to allow write access to the ROM region, an unintended signal appearing like the enable signal may possibly be generated due to noise or the like. Therefore, depending on the signal, the address information of the register may be overwritten. If the address information is replaced, for instance, such that a part of the address range in the ROM region is erroneously described as belonging to the RAM region, undesirable write access (i.e., writing) to an unintended area of the ROM region is likely to occur afterwards.

However, according to the above-described configuration, when the enable signal is deactivated, the address information stored in the register is renewed to the initial value regardless of whether the signal was inputted intentionally or the signal was due to noise. Accordingly, even if the address information is erroneously changed, the contents of the address information can be returned to the initial value so that unintended writing of data to the ROM region can be avoided.

Thus, according to the above-described configuration, the data stored in the ROM region can be renewed when it is necessary, and also unintended write access to the ROM region in the non-volatile RAM can be prevented.

In this configuration, after the control apparatus or the protecting portion is activated, the address information as an initial value may be stored into the register in the protecting portion. For example, as a second aspect of the configuration, the following configuration can be employed.

In the second aspect of the configuration; the non-volatile RAM stores the address information in advance. The initializing means is configured to store the address information stored in the non-volatile RAM into the register as the initial value when the control apparatus or the protecting portion is activated and to restore the address information stored in the non-volatile RAM into the register when the enable signal is deactivated so as to renew the address information in the register to be the predetermined address information as the initial value.

In this configuration, when the control apparatus or the protecting portion is activated, the address information as an initial value can be stored in the register of the protecting portion. Although the address information as the initial value is stored to the non-volatile RAM, other memory devices to which the protecting portion is able to access can be used as long as the state of the address information is reliably maintained.

In the above-described respective configurations, this specific configuration to determine activation of the enable signal and deactivation of the enable signal is not the only one possible. For example, the following configuration may be employed to determine activation of the enable signal and deactivation of the enable signal.

As a third aspect of the configuration, the protecting portion further includes edge detecting means for detecting a start edge indicating a signal level change when the enable signal is activated and for detecting a termination edge indicating a signal level change when the enable signal is deactivated. The access enabling means is configured to enable the CPU to write data to the ROM region from a time when the edge detecting means detects the start edge to a time when the edge detecting means detects the termination edge, when the CPU performs a write access to the ROM region.

According to the third aspect of the configuration, based on the start edge and the termination edge, it is determined that the enable signal is activated or deactivated.

It is noted that the start edge is defined as a signal level change when the enable signal is being activated and the termination edge is defined as a signal level change when the enable signal is being deactivated.

In this configuration, based on the start edge and the termination edge, it is determined that the enable signal is activated or deactivated. However, the signal level of the enable signal can be detected so as to determine the activation and deactivation thereof. Also, the configuration may be changed such that the start edge and the termination edge are delayed by a delay circuit configured by a digital signal processing and both edges are detected based on the delayed signals.

The specific configuration to detect the start edge and the termination edge of the enable signal with this configuration is exemplified as a fourth aspect of the configuration as follows.

As the fourth aspect of the configuration, the protecting portion further includes a signal path used for conducting the enable signal which is inputted to the protecting portion externally. The edge detection means is configured to detect the start edge and the termination edge of a signal being conducted through the signal path.

In this configuration, based on the signal being conducted through the signal path, the start edge and the termination edge of the enable signal can be detected. Further, this configuration can be modified to be more accurate to detect the start edge and the termination edge. In this regard, it is considered that a fifth aspect of the configuration can be introduced as follows.

As the fifth aspect of the configuration, the protecting portion further includes a filter circuit in which the signal level of the signal being conducted through the signal path is converted to be either High or Low level when the signal level is within a predetermined range adapted to the enable signal, and the signal level is converted to be the other level between High or Low level when the signal level is not within the predetermined range, the converted signal being outputted by the filter circuit. The edge detection means is configured to detect an edge of the converted signal outputted by the filter circuit as the start edge when the signal level of the converted signal changes to either High or Low level and to detect an edge of the converted signal as the termination edge when the signal level of the converted signal changes to the other signal level between High or Low level.

According to the fifth aspect of the configuration, the signal on the signal path is converted to High or Low level before detecting the start edge or the termination edge. Hence, the start edge and the termination edge can be detected accurately compared to detecting the edge by using an analog value.

In this configuration, to convert the signal level, it is considered that the following configuration can be employed.

As a sixth aspect of the configuration, in the protecting portion, the filter circuit includes a comparator that compares the signal level of the signal in the signal path with a predetermined reference level, the filter circuit is configured to output either High or Low level signal when the signal level of the signal is higher than the reference level and output the other signal level between High or Low level when the signal level of the signal being conducted through the signal path is lower than the reference level.

According to the sixth aspect of the configuration, the comparator compares the signal level on the signal path with a predetermined level thereby converting the signal on the signal path. Regarding a configuration to convert the signal level on the signal being conducted through the signal path, the following configuration can be employed.

As a seventh aspect of the configuration, in the protecting portion, the access enabling means is configured to determine that the enable signal inputted from outside the protecting portion is active by calculating a logical AND of a predetermined clock signal and the enable signal.

According to the seventh aspect of the configuration, the period while the enable signal is activated can be determined when the signal level of the signal being conducted through the signal path is synchronized to the clock signal.

As a eighth aspect of the configuration, a protection apparatus is provided intervening between a non-volatile RAM divided into a plurality of memory regions including a ROM region from which data is read and a RAM region where data is read and written and a CPU capable of executing a plurality of types of access to the non-volatile RAM, the plurality of access types including writing data to the ROM region. The protection apparatus includes: a register for storing address information capable of specifying address ranges corresponding to the ROM region and RAM region among the memory regions of the non-volatile RAM; access enabling means for enabling the CPU to write data to the ROM region while an enable signal inputted to the protection apparatus externally is active, when the CPU performs a write-access to the ROM region; and initializing for initializing the address information stored in the register to predetermined address information as an initial value when the enable signal is deactivated after activating the enable signal.

The protection apparatus can be adapted to the control apparatus configured as the above-described respective configurations. The protection apparatus may be configured as similar to the above-described second to seven aspects of the configurations. Further, the following protection method can be adapted to the above described protection apparatus. The protection method is employed for protecting a non-volatile RAM and is executed on a protection apparatus intervening between the non-volatile RAM divided into a plurality of memory regions including a ROM region from which data is read and a RAM region where data is read and written and a CPU capable of executing a plurality of types of access to the non-volatile RAM, the plurality of access types including writing data to the ROM region and having a register for storing address information capable of specifying address ranges corresponding to the ROM region and RAM region among the memory regions of the non-volatile RAM. The protection method includes steps of enabling the CPU to write data to the ROM region while an enable signal externally inputted to the protection apparatus is active, when the CPU performs a write-access to the ROM region; and initializing the address information stored in the register to be predetermined address information as an initial value when the enable signal is deactivated after activating the enable signal.

The above-described method can be executed on the protecting portion or the protection apparatus so as to obtain the same advantages of the above-described configurations. As to the above-described method, each step of the method can be a computer program executable on a computer system as well. Accordingly, the same advantages of the above-described configurations can be obtained by the computer system that executes the programs.

It is noted that the program is configured by a plurality of instructions sequentially executable on the computer system and the program is provided to various computer media, or to control apparatuses or a protection apparatus or users who use programs by transmission via a communication line.

DETAILED DESCRIPTION OF THE PREFERRED EMBODIMENTS

Figure 1:
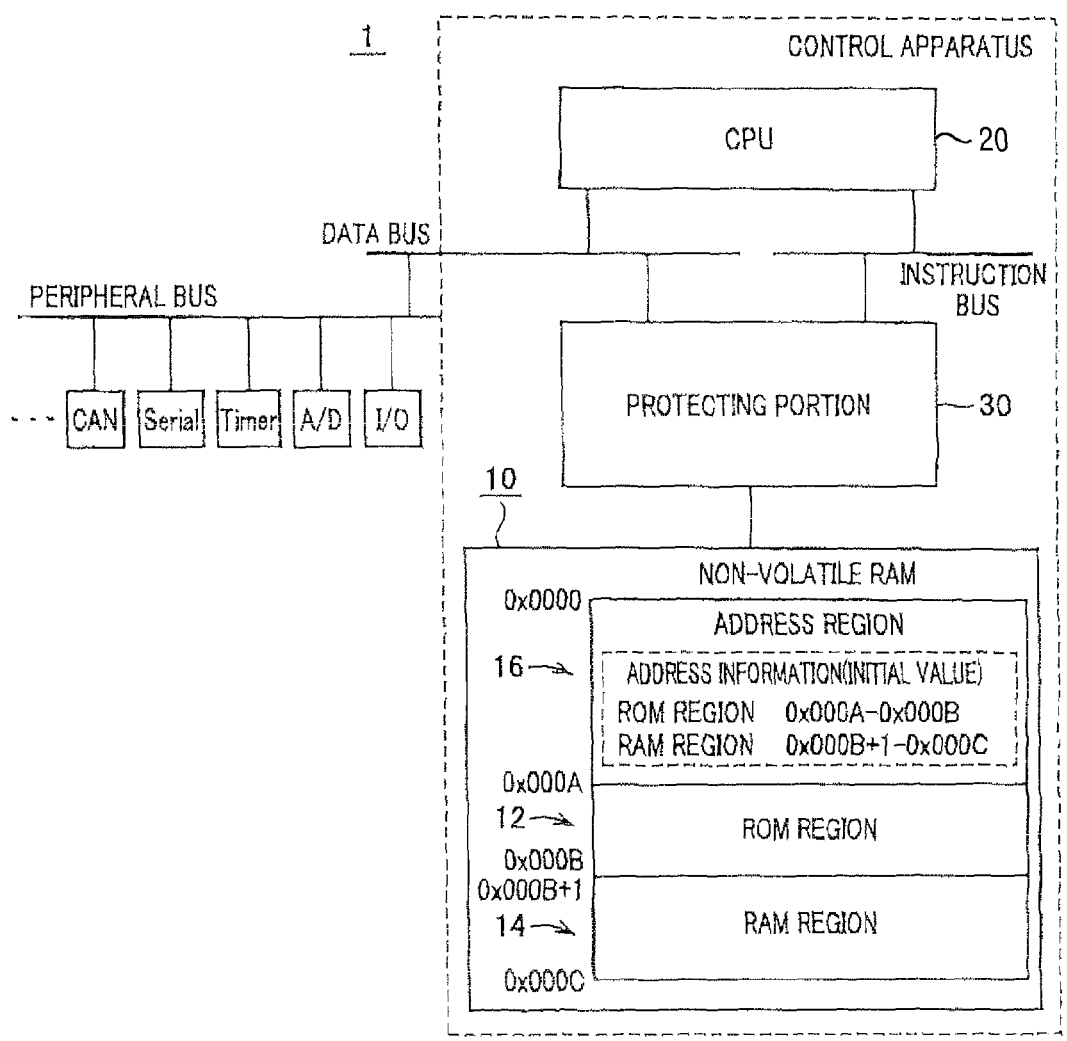
FIG. 1 is a block diagram showing an overall configuration of a control apparatus.

With reference to the drawings, hereinafter will be described an embodiment of the present invention.
(1) Overall Configuration As shown in FIG. 1, a control apparatus 1 is provided with a non-volatile RAM 10 in which a plurality of memory region are defined, CPU 20 capable of executing a plurality of types of access to the non-volatile RAM 10, and a protecting portion 30 which intervenes between the CPU 20 and the RAM 10.

The non-volatile RAM 10 is divided into a plurality of memory regions including a ROM region 12 used for only reading data, a RAM region 14 used for both reading and writing data and an address region 16 used to store address information. The address information can specify respective address ranges corresponding to the ROM region 12 and the RAM region 14. According to the embodiment, the address information is defined to specify the address range itself of the respective regions.

The CPU 20 selectively executes various accesses to the non-volatile RAM 10 including reading data from the ROM region 12, writing data to the ROM region 12, reading data from the RAM region 14 and writing data to the RAM region 14.

Figure 2:
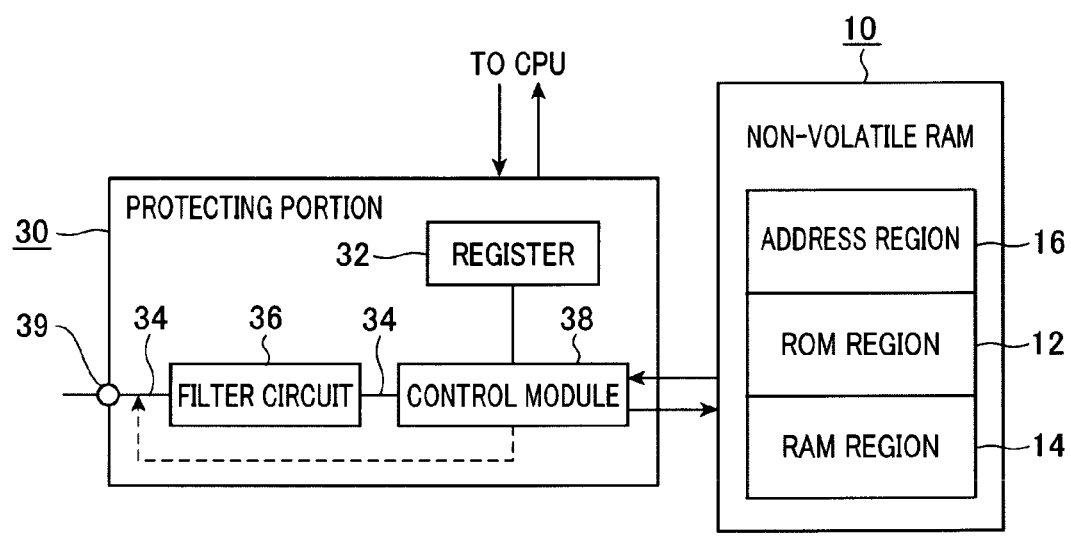
FIG. 2 is a block diagram showing a configuration of a protecting portion.

The protecting portion 30 is designed to relay the communication between the CPU 20 and the non-volatile RAM 10 which is performed by the access from the CPU 20 and to execute an arbitration of the communication as well. As shown in FIG. 2, the protecting portion 30 is provided with a register 32 used to store the address information, a signal path 34 used for transmitting the enable signal to the protecting portion 30, a filter circuit 36, and a control module 38 adapted to control the protecting portion 30.

The filter circuit 36 is designed to convert a signal level of the signal being conducted through the signal path 34 to be either High or Low level when the signal level is within a predetermined range as an enable signal. On the other hand, when the signal is not within the predetermined range, the filter circuit 36 converts the signal level to be the other signal level between High and Low levels. The converted signal is outputted to the control module 38. According to the embodiment, the enable signal is inputted to the protecting portion 30 externally via a dedicated terminal 39. However, the enable signal may be transmitted to the protecting portion via a signal-bus from outside the control apparatus 1. In this case, the enable signal is transmitted to the protecting portion via the control module 38 (dashed-arrow line as shown in FIG. 2).

Figure 3A:
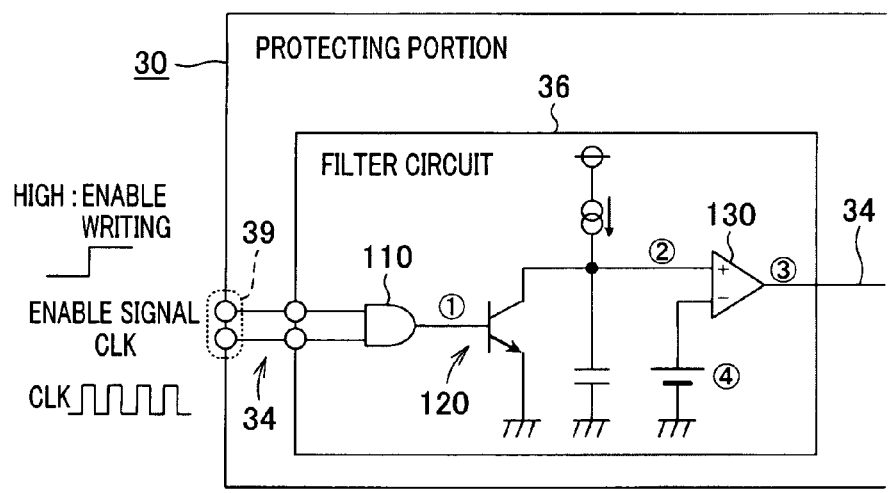
FIG. 3A is a circuit diagram showing a detail configuration of a filter circuit.

With reference to FIG. 3A, a detailed configuration of the protecting portion 30 is now described. As shown in FIG. 3A, the protecting portion is configured by a logical AND circuit 110 in which a signal (High or Low level) representing logical AND between the enable signal and a clock signal (CLK) is generated, an open-collector type switching element 120 driven by the logical AND circuit 110 and which operates to conduct the power source signal to be grounded, and a comparator 130 adapted to compare the power source signal with a reference voltage which is lower than the voltage level of the power source signal. It is noted that the comparator 130 may be configured to have a hysteresis depending on variation of the input level.

Figure 3B:
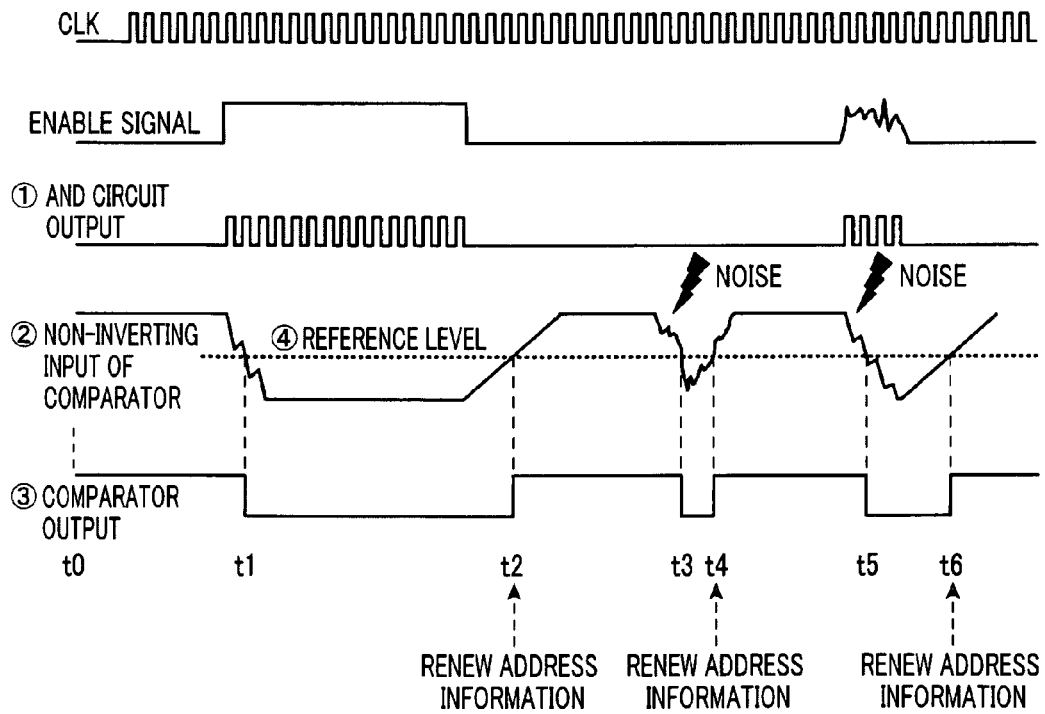
FIG. 3B is a timing diagram showing an operation of the filter circuit.

In the filter circuit 36, since the switching element 120 does not operate when the enable signal is not inputted (not active), the power source signal is inputted to the comparator 130 and is compared with the reference voltage. As described above, the reference voltage is lower than that of the power source signal so that the output of the comparator 130 becomes High level (FIG. 3B, t0-t1, t2-t3 and t4-t5).

Meanwhile, when the enable signal turns to active (High level), the switching element 120 start to operate so that the power source signal is grounded, that is, the power source signal is not inputted to the comparator 130. Hence, one input of the comparator 130 becomes Low level so that the output signal of the comparator 130 becomes Low (FIG. 3B, t1-t2, t3-t4 and t5-t6).

The control module 38 is designed to relay the communication between the CPU 20 and the non-volatile RAM 10 which is performed by the access from the CPU 20. Moreover, when the CPU 20 performs a write-access, i.e., writing data, to the ROM region 12, the control module 38 allows the CPU 20 to write data to the ROM region 12 only when the enable signal is active.

Specifically. the control module 38 is configured to monitor the signal on the signal path 34 and to verify the destination required by an access of the CPU 20 simultaneously, and based on the signal level on the signal path 34 and the destinations of the CPU access, the control 20 module 38 allows the CPU 20 to write data to the ROM region 12 when the enable signal is active.

Regarding the monitoring of the signal on the signal path 34, the output level of the filter circuit 36 (comparator 130) is verified to determine whether or not the enable signal is active. In more detail, it is determined that the enable signal is activated when a signal edge (start edge) where its signal level changes is detected and when the signal level is kept continuous. Thus, the control module 38 is designed to indirectly detect the signal edge when the signal level of the enable signal is changed based on the output of the filter circuit 36.

Regarding the verification of the destination of the CPU access, the destination of the CPU access and the address range specified by the address information stored in the register 32 are compared to verify the destination of the CPU. When the destination and the address range specified by the address information are at least partially overlapped, it is determined that the access by the CPU 20 is a write access (writing data) to the ROM region 12. As to the address information to be stored in the register 32, the control apparatus 1 or the protecting portion read the address information from the address region of the non-volatile RAM 10 when the control apparatus 1 or the protecting portion 30 is activated, and stores the address information to the register 32 as an initial value.

The control module 38 is configured to restore the address information stored in the non-volatile RAM 10 to the register 32 when the enable signal is deactivated whereby the address information is renewed to be predetermined address information as the initial value.

In the control apparatus 1 configured as described above, when the enable signal is not active, that is, no active signal is inputted from outside the protecting portion 30, the output signal from the protecting portion 30 turns to High (FIG. 35, t0-t1, t2-t3 and t4-t5). Thus, even if the write access to the ROM 12 occurs, the access is inhibited.

Meanwhile, when the active enable signal is inputted from outside the protecting portion, the output signal of the protecting portion (output of the comparator 130) turns to Low regardless of any signal being either inputted intentionally or caused by noise (FIG. 3B, t1-t2, t3-t4 and t5-t6) so that the write access to the ROM region 12 is allowed as long as the output signal stays Low level. When the enable signal is deactivated, the address information stored in the register 32 is renewed to be the address information which is stored in the non-volatile RAM 10 (FIG. 3B, t2, t4 and t6), (2) Advantages The control apparatus 1 according to the embodiment, write access to the ROM region 12 is allowed while the enable signal is active (FIG. 3B, t1-t2, t3-t4 and t5-t6) so that write access to the ROM region can be made at this timing. As a result, programs supposed to be read and executed by the CPU 20 can be updated when necessary.

Here, it is considered that when the enable signal is used to allow the write access to the ROM region, an unintended signal similar to the enable signal may possibly be generated due to noise or the like. Therefore, depending on the signal, the address information of the register 32 may be replaced. If the address information is erroneously replaced, for instance, with one belonging to the RAM region 14, undesirable write access (writing) to an unintended area of the ROM region 12 is likely to occur.

However, according to the above-described embodiment, when the enable signal is deactivated, the address information stored in the register 32 is renewed to the initial value regardless of the signal inputted intentionally or the signal is due to the noise (FIG. 3B, t2, t4, t6). Accordingly, even if the address information is erroneously changed, the contents of the address information can be resumed to the initial value so that unintended writing data to the ROM region can be avoided.

Thus, according to the above-described embodiment, the data stored in the ROM region 12 can be updated when it is necessary, and also unintended write access to the ROM region 12 in the non-volatile RAM 10 can be prevented.

Further, according to the above-described embodiment, after the activation of the control apparatus 1 or the protecting portion 30, the address information can be stored to the register 32 before operation starts. According to the embodiment, the start edge occurring when the enable signal is activated and a termination edge occurring when the enable signal is deactivated are detected so as to determine the timing of the enable signal being started and ended respectively.

According to the above-described embodiment, the signal on the signal path 34 is detected to recognize the start edge and the termination edge indirectly. Moreover, the filter circuit 36 is disposed on the signal path 34 so that the signal on the signal path 34 can be converted to the High or Low level before detecting the start edge or the termination edge. Hence, the start edge and the termination edge can be detected accurately compared to detecting the edge by using an analog value.

Specifically, the comparator 130 compares the signal level on the signal path with a predetermined level thereby converting the signal on the signal path 34.

(3) Modification

The present disclosure is not limited to the embodiment described above but may be modified in variable manners within a scope not departing from the spirit of the present disclosure.

In the above-described embodiment, a configuration such that the address information as an initial value is stored in the non-volatile RAM 10 in advance is exemplified. However, the configuration is not limited to the one using the non-volatile RAM 10. For instance, the address information can be stored to other memory devices to which the protecting portion 30 can access as long as state of the memory used for the address information is reliably maintained.

Figure 4A:
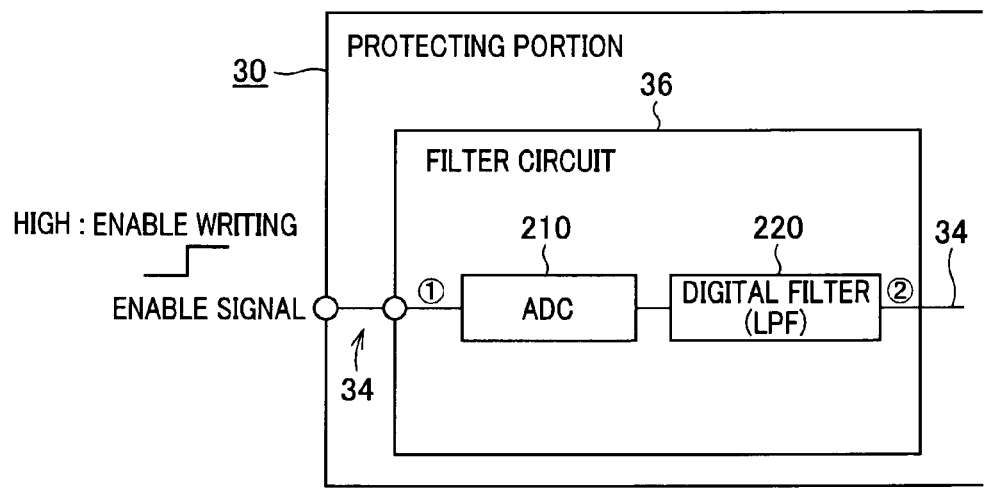
FIG. 4A is a circuit diagram showing a detail configuration of a filter circuit according to other embodiment.
Figure 4B:
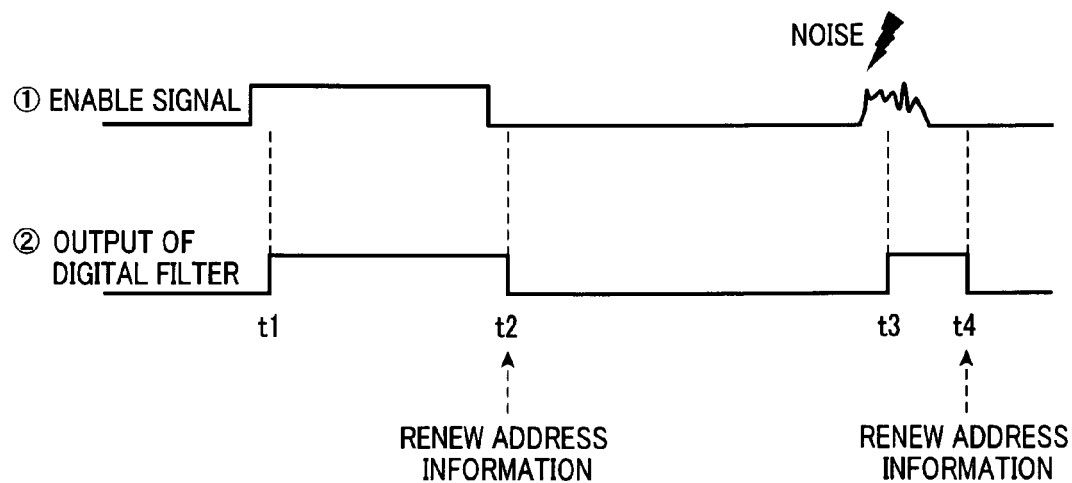
FIG. 4B is a timing diagram showing an operation of the filter circuit of FIG. 4A.

Further more, as shown in FIG. 4A, the configuration of the filter circuit 36 can be modified to use an analog to digital converter (ADC) 210 and a digital filter 220. As shown in FIG. 4B, in this configuration, the enable signal is delayed by the digital processing and the signal edge is detected on the delayed signal.

In the above-described embodiment, the control module 38 corresponds to access enabling means, initializing and edge detecting means.

What is claimed is:

1. A control apparatus comprising:
a non-volatile Random Access Memory (RAM) divided into a plurality of memory regions including a Read-Only Memory (ROM) region from which data is read and a RAM region where data is read and written;
a Central Processing Unit (CPU) capable of executing a plurality of types of access to the non-volatile RAM, the plurality of types of access including writing data to the ROM region; and
a protecting portion intervening between the CPU and the non-volatile RAM, wherein the protecting portion comprises:
a register for storing address information capable of specifying address ranges corresponding to the ROM region and the RAM region among the memory regions of the non-volatile RAM;
access enabling means for enabling the CPU to write data to the ROM region while an enable signal inputted to the protecting portion externally is active, when the CPU performs a write-access to the ROM region; and
initializing means for initializing the address information stored in the register to be predetermined address information as an initial value when the enable signal is deactivated after activating the enable signal.

2. The control apparatus according to claim 1, wherein the non-volatile RAM stores the address information in advance, the initializing means is configured to store the address information stored in the non-volatile RAM into the register as the initial value when the control apparatus or the protecting portion is activated and to restore the address information stored in the non-volatile RAM into the register when the enable signal is deactivated so as to renew the address information in the register to be the predetermined address information as the initial value.

3. The control apparatus according to claim 2, wherein
the protecting portion further comprises edge detecting means for detecting a start edge indicating a signal level change when the enable signal is activated and for detecting a termination edge indicating a signal level change when the enable signal is deactivated, and the access enabling means is configured to enable the CPU to write data to the ROM region from a time when the edge detecting means detects the start edge to a time when the edge detecting means detects the termination edge, when the CPU performs a write-access to the ROM region.

4. The control apparatus according to claim 2, wherein the access enabling means is configured to determine that the enable signal inputted from outside the protecting portion is active by calculating a logical AND of a predetermined clock signal and the enable signal.

5. The control apparatus according to claim 1, wherein
the protecting portion further comprises edge detecting means for detecting a start edge indicating a signal level change when the enable signal is activated and for detecting a termination edge indicating a signal level change when the enable signal is deactivated, and the access enabling means is configured to enable the CPU to write data to the ROM region from a time when the edge detecting means detects the start edge to a time when the edge detecting means detects the termination edge, when the CPU performs a write-access to the ROM region.

6. The control apparatus according to claim 5, wherein the protecting portion further comprises a signal path used for conducting the enable signal to the protecting portion, and the edge detection means is configured to detect the start edge and the termination edge of a signal being conducted through the signal path.

7. The control apparatus according to claim 6, wherein the protect portion further comprises a filter circuit in which the signal level of the signal being conducted through the signal path is converted to be either High or Low level when the signal level is within a predetermined range adapted to the enable signal, and the signal level is converted to be the other level between High and Low level when the signal level is not within the predetermined range, the converted signal being outputted by the filter circuit, and the edge detection means is configured to detect an edge of the converted signal outputted by the filter circuit as the start edge when the signal level of the converted signal changes to either High or Low level and to detect an edge of the converted signal as the termination edge when the signal level of the converted signal changes to the other signal level between High and Low level.

8. The control apparatus according to claim 7, wherein the filter circuit includes a comparator that compares the signal level of the signal being conducted through the signal path with a predetermined reference level and outputs a comparison result, the filter circuit is configured to output either High or Low level signal in response to the comparison result outputted by the comparator.

9. The control apparatus according to claim 8, wherein the access enabling means is configured to determine that the enable signal inputted from outside the protecting portion is active by calculating a logical AND of a predetermined clock signal and the enable signal.

10. The control apparatus according to claim 6, wherein the access enabling means is configured to determine that the enable signal inputted from outside the protecting portion is active by calculating a logical AND of a predetermined clock signal and the enable signal.

11. The control apparatus according to claim 7, wherein the access enabling means is configured to determine that the enable signal inputted from outside the protecting portion is active by calculating a logical AND of a predetermined clock signal and the enable signal.

12. The control apparatus according to claim 5, wherein the access enabling means is configured to determine that the enable signal inputted from outside the protecting portion is active by calculating a logical AND of a predetermined clock signal and the enable signal.

13. The control apparatus according to claim 1, wherein the access enabling means is configured to determine that the enable signal inputted from outside the protecting portion is active by calculating a logical AND of a predetermined clock signal and the enable signal.

14. A protection apparatus intervening between a non-volatile Random Access Memory (RAM) divided into a plurality of memory regions including a Read-Only Memory (ROM) region from which data is read and a RAM region where data is read and written and a Central Processing Unit (CPU) capable of executing a plurality of types of access to the non-volatile RAM, the plurality of types access including writing data to the ROM region, the protection apparatus comprising:
a register for storing an address information capable of specifying address ranges corresponding to the ROM region and the RAM region among the memory regions of the non-volatile RAM;
access enabling means for enabling the CPU to write data to the ROM region while an enable signal inputted to the protection apparatus externally is active, when the CPU performs a write-access to the ROM region; and
initializing means for initializing the address information stored in the register to be predetermined address information as an initial value when the enable signal is deactivated after activating the enable signal.

15. A protection method for protecting a non-volatile Random Access Memory (RAM) executed on a protection apparatus intervening between the non-volatile RAM divided into a plurality of memory regions including a Read-Only Memory (ROM) region from which data is read and a RAM region where data is read and written and a Central Processing Unit (CPU) capable of executing a plurality of types of access to the non-volatile RAM, the plurality of types of access including writing data to the ROM region and having a register for storing address information capable of specifying address ranges corresponding to the ROM region and the RAM region among the memory regions of the non-volatile RAM, the protection method comprising steps of:
enabling the CPU to write data to the ROM region while an enable signal inputted to the protection apparatus externally is active, when the CPU performs a write-access to the ROM region; and
initializing the address information stored in the register to be a predetermined address information as an initial value when the enable signal is deactivated after activating the enable signal.

* * * * *